United States Patent
Fong et al.

(10) Patent No.: US 7,327,716 B2
(45) Date of Patent: Feb. 5, 2008

(54) REVERSE LINK ENHANCEMENT FOR CDMA 2000 RELEASE D

(75) Inventors: Mo-Han Fong, L'Orignal (CA); Jun Li, Richardson, TX (US); Ashvin H. Chheda, Plano, TX (US); Sophie Vrzic, Nepean (CA); Hang Zhang, Nepean (CA); Ali Iraqi, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 670 days.

(21) Appl. No.: 10/794,787

(22) Filed: Mar. 5, 2004

(65) Prior Publication Data

US 2004/0240424 A1 Dec. 2, 2004

Related U.S. Application Data

(60) Provisional application No. 60/527,525, filed on Dec. 5, 2003, provisional application No. 60/501,507, filed on Sep. 9, 2003, provisional application No. 60/499,584, filed on Sep. 2, 2003, provisional application No. 60/497,775, filed on Aug. 26, 2003, provisional application No. 60/495,544, filed on Aug. 15, 2003, provisional application No. 60/493,821, filed on Aug. 8, 2003, provisional application No. 60/493,099, filed on Aug. 6, 2003, provisional application No. 60/489,236, filed on Jul. 22, 2003, provisional application No. 60/482,794, filed on Jun. 26, 2003, provisional application No. 60/478,792, filed on Jun. 16, 2003, provisional application No. 60/475,440, filed on Jun. 3, 2003, provisional application No. 60/469,778, filed on May 12, 2003, provisional application No. 60/469,106, filed on May 9, 2003, provisional application No. 60/468,442, filed on May 6, 2003, provisional application No. 60/462,220, filed on Apr. 11, 2003, provisional application No. 60/459,534, filed on Apr. 1, 2003, provisional application No. 60/457,215, filed on Mar. 25, 2003, provisional application No. 60/454,714, filed on Mar. 14, 2003, provisional application No. 60/452,370, filed on Mar. 6, 2003.

(51) Int. Cl.
*H04J 3/24* (2006.01)

(52) U.S. Cl. .............. 370/349; 370/322; 370/341; 370/395.4; 370/229; 370/230; 370/231; 455/450; 455/451; 455/452.1; 455/452.2; 455/453

(58) Field of Classification Search ............... 370/349, 370/229, 230, 231, 322, 341, 395.4; 455/450, 455/451, 452.1, 452.2, 453
See application file for complete search history.

(56) References Cited

U.S. PATENT DOCUMENTS

| | | | |
|---|---|---|---|
| 6,535,523 B1 * | 3/2003 | Karmi et al. | 370/468 |
| 6,741,862 B2 * | 5/2004 | Chung et al. | 455/452.1 |
| 7,058,124 B2 * | 6/2006 | Koo | 375/225 |
| 2002/0181410 A1 * | 12/2002 | Bae et al. | 370/252 |
| 2003/0093364 A1 * | 5/2003 | Bae et al. | 705/37 |
| 2003/0125037 A1 * | 7/2003 | Bae et al. | 455/450 |

\* cited by examiner

*Primary Examiner*—Steve M. D'Agosta
(74) *Attorney, Agent, or Firm*—Garlick Harrison & Markison; James A. Harrison; Kevin L. Smith

(57) ABSTRACT

A mobile station transmits sub-packets at a specified transmission rate or an autonomous transmission rate based on a PERSISTENCE bit. The mobile station increments, decrements, or does not change the transmission rate when the PERSISTENCE bit is a second logic state and a rate control bit (RCB) value is a first, a second, or a third value. Another embodiment of the present invention includes an ALL_ACID_IND bit that instructs the mobile station to adjust the specified transmission rate for either a single H-ARQ channel or for all H-ARQ channels. In an alternate embodiment, the mobile station uses the RCB in conjunction with a NAK to adjust a transmission-to-pilot ratio. After the NAK, the mobile station monitors the RCB value to increase the transmission rate, decrease the transmission rate, or not to change the transmission rate of subsequent sub-packets of the same data packet.

27 Claims, 9 Drawing Sheets communication network communication network mobile station

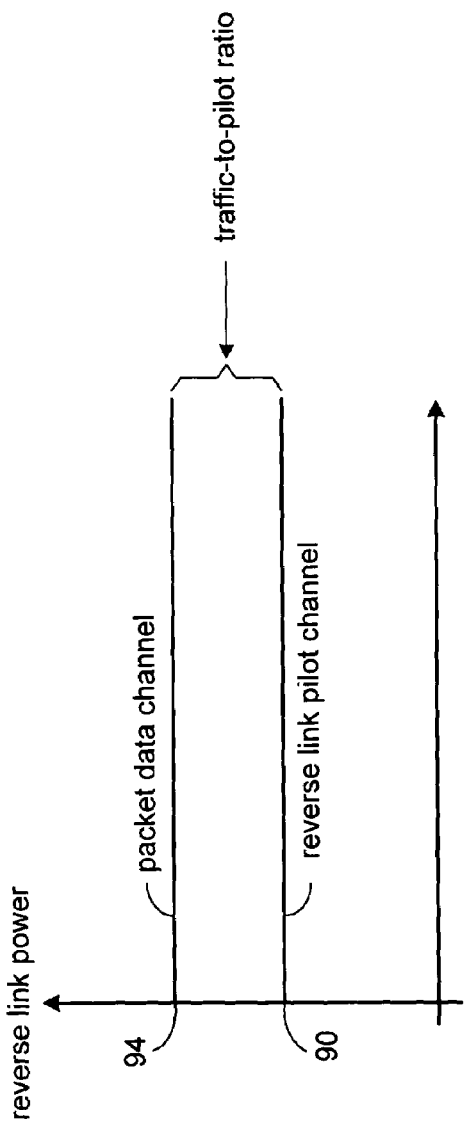
FIG. 3A traffic to pilot ratio
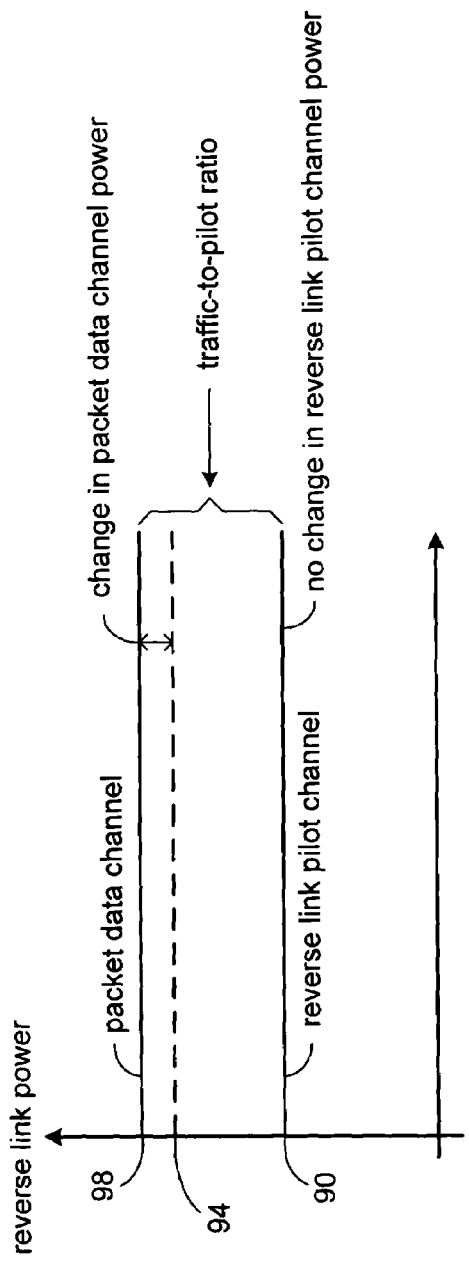
FIG. 3B adjusted traffic to pilot ratio

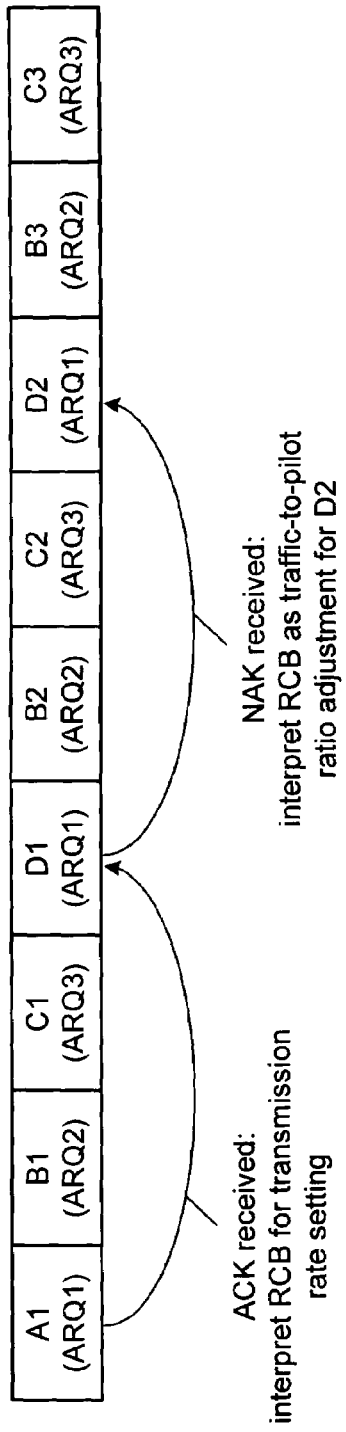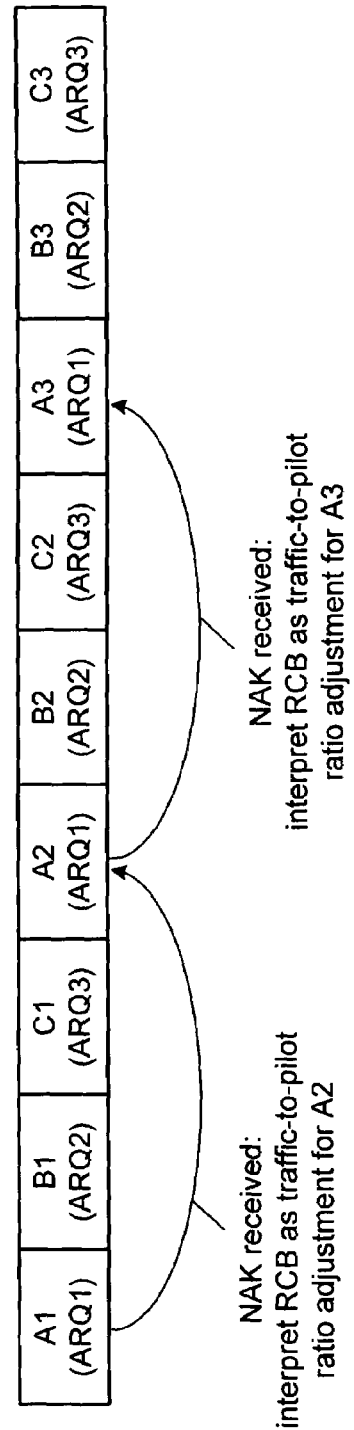

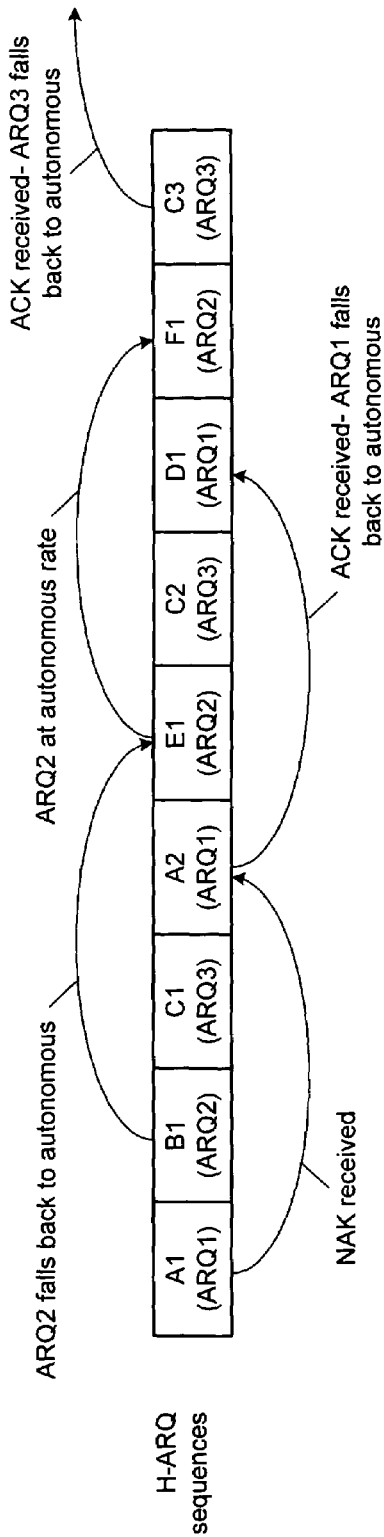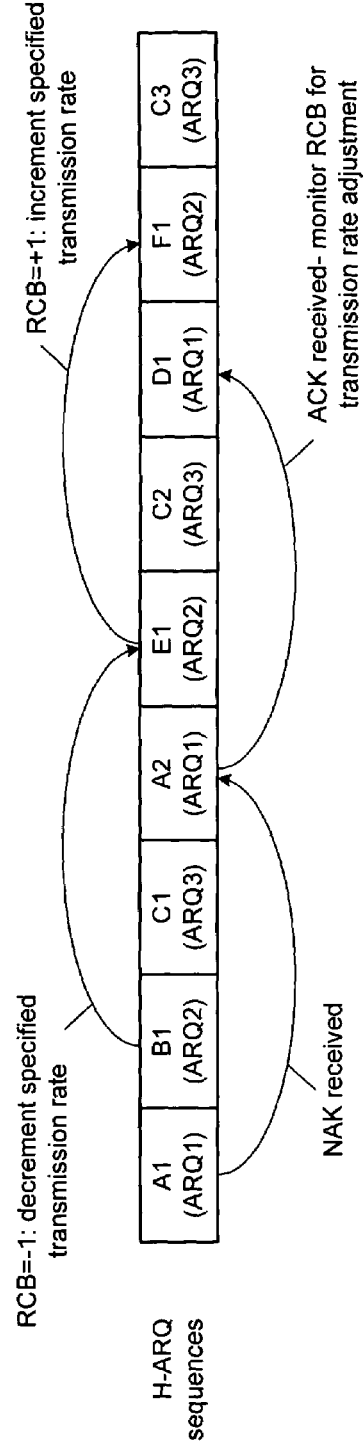

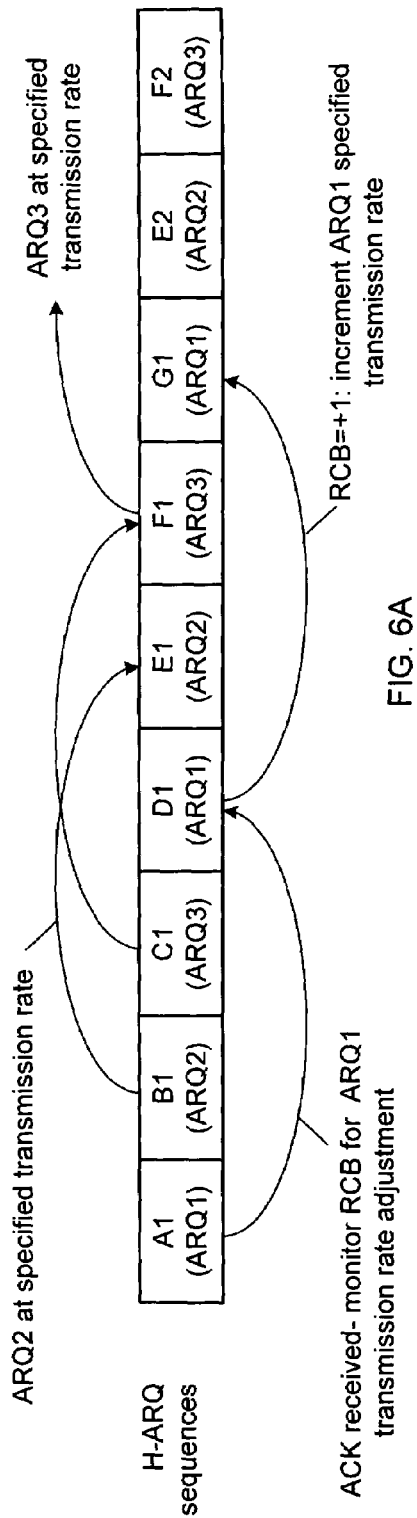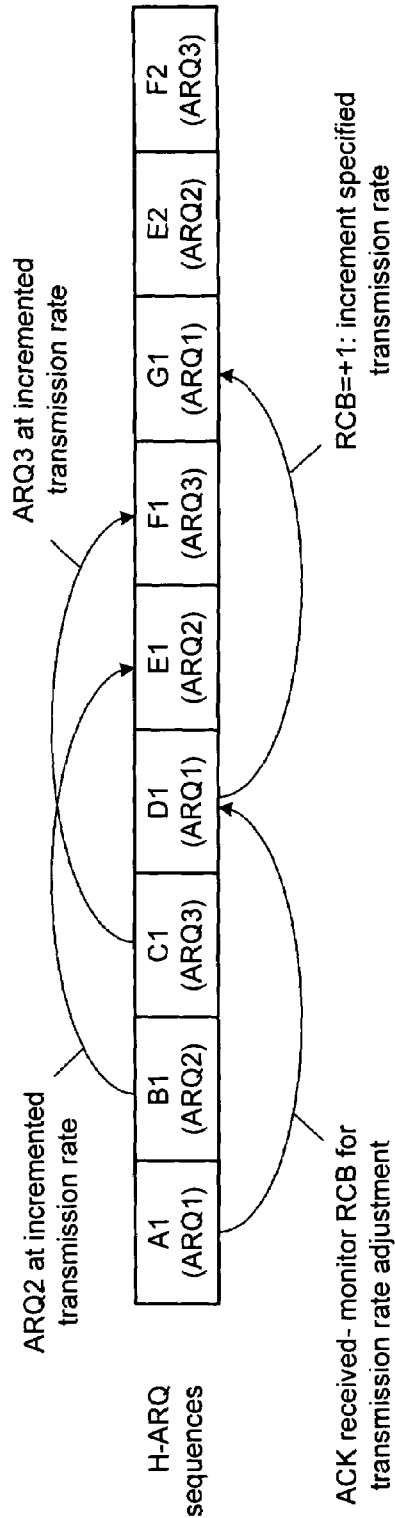

method for controlling incremental power reverse link transmission method reverse link transmission method

REVERSE LINK ENHANCEMENT FOR CDMA 2000 RELEASE D

CROSS REFERENCE TO RELATED APPLICATIONS.

This application claims priority to and incorporates by reference, in their entirety for all purposes, the following U.S. Provisional Applications:
(1) U.S. Provisional Application Ser. No. 60/452,370 filed Mar. 6, 2003
(2) U.S. Provisional Application Ser. No. 60/454,714 filed Mar. 14, 2003
(3) U.S. Provisional Application Ser. No. 60/457,215 filed Mar. 25, 2003
(4) U.S. Provisional Application Ser. No. 60/459,534 filed Apr. 1, 2003
(5) U.S. Provisional Application Ser. No. 60/462,220 filed Apr. 11, 2003
(6) U.S. Provisional Application Ser. No. 60/468,442 filed May 6, 2003
(7) U.S. Provisional Application Ser. No. 60/469,106 filed May 9, 2003
(8) U.S. Provisional Application Ser. No. 60/469,778 filed May 12, 2003
(9) U.S. Provisional Application Ser. No. 60/475,440 filed Jun. 3, 2003
(10) U.S. Provisional Application Ser. No. 60/478,792 filed Jun. 16, 2003
(11) U.S. Provisional Application Ser. No. 60/482,794 filed Jun. 26, 2003
(12) U.S. Provisional Application Ser. No. 60/489,236 filed Jul. 22, 2003
(13) U.S. Provisional Application Ser. No. 60/493,099 filed Aug. 6, 2003
(14) U.S. Provisional Application Ser. No. 60/493,821 filed Aug. 8, 2003
(15) U.S. Provisional Application Ser. No. 60/495,544 filed Aug. 15, 2003
(16) U.S. Provisional Application Ser. No. 60/497,775 filed Aug. 26, 2003
(17) U.S. Provisional Application Ser. No. 60/499,584 filed Sep. 2, 2003
(18) U.S. Provisional Application Ser. No. 60/501,507 filed Sep. 9, 2003
(19) U.S. Provisional Application Ser. No. 60/527,525 filed Dec. 5, 2003.

BACKGROUND OF THE INVENTION

1. Field of the Invention

The present invention relates to packet data networks and, more particularly, the present invention relates to reverse link scheduling in the packet data networks.

2. Description of Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NASs) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and audio). Initially, traditional Public Switched Telephone Networks (PSTNs) were used for data transmissions but have been largely supplanted by packet data networks, including various versions of the Internet.

The wireless domain has had a parallel history. Initial voice networks, including Advanced Mobile Phone Service (AMPS), Time Division Multiple Access (TDMA), including North American TDMA and Global System for Mobile Communications (GSM) networks, were used to conduct data in a limited capacity. These networks are being replaced, however, by newer wireless data-only or data-centric networks, as well as mixed data and voice networks. The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, medium access control (MAC) layer operations, link layer operations, signaling protocols, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include mobile station controllers (MSCs), base station controllers (BSCs) and base station transceiver sets (BTSs) that jointly operate to communicate with mobile stations over a wireless communication link. BSCs and BTSs collectively are referred to as BSs or base stations. Examples of common networks include GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, the MSC communicates with the BSC to prompt the BTS to generate paging signals to a specified mobile station within a defined service area typically known as a cell or sector (a cell portion). The mobile station, upon receiving the page request, responds to indicate that it is present and available to accept an incoming call. Thereafter, the BSC, upon receiving a page response from the mobile station, communicates with the MSC to advise it of the same. The call is then routed through the BSC to the mobile station as the call setup is completed and the communication link is created. Alternatively, to establish a call, a mobile station generates call setup signals that are processed by various network elements in a synchronized manner to authenticate the user as a part of placing the call.

The next generation of cellular networks presently being developed is being modified from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless channel, as well as to be able to receive continuous bit rate data, including so called "streaming data". Accordingly, different systems and networks are being developed to expand such capabilities and to improve their operational characteristics.

One example of a system that is presently being deployed with voice and data capabilities is the cdma2000 network. The cdma2000 network, however, is developed from the IS-95 networks that were optimized for voice transmissions and therefore is not optimized for transmitting data even though its data transport capability is significantly improved from prior art networks and systems. More formally, the 1xRTT standard defines CDMA operation for data transmissions.

IS-95, while designed primarily for voice services, can support simple data type applications, such as short message service (SMS). It can also support wireless Internet access through circuit switched data mode, with the data rate limited to 14.4 kb/s. However, it is unable to provide a majority of multi-media services users have come to expect with typical home-based broadband connections to the Internet.

1xRTT improves upon the design of IS-95. Voice capacity is approximately doubled and, in addition, 1xRTT supports packet-based access to the Internet. The data rate in 1xRTT is limited to 614.4 kb/s. This is the maximum available rate in theory to one user, though in practice a user will never get such a rate. On average, users may expect as much as 153.6 kb/s for brief periods of time, with an average rate of about 80 kb/s. As a result, certain data applications are still not viable in 1xRTT, such as video conferencing. 1xRTT is backwards compatible to IS-95.

One data-only network that is being developed is defined by the 1xEV-DO standard, also known as IS-856. The 1xEV-DO standard defines a time burst system utilizing a 1.25 MHz carrier that is set at a carrier frequency that is adjacent to the frequencies used by the voice networks. In one particular network, a 1.67 millisecond (mS) burst is used for the forward link in a 1xEV-DO network. Typical 1xEV-DO networks include a Packet Data Service Node (PDSN) for performing routing and switching for a data packet or data packet stream, an Access Network Controller (ANC) that establishes and manages the wireless communication link with the mobile terminal, and a Packet Control Function (PCF) that is largely an interface device for converting signals between the packet domain and a wireless network that will be used for the communication link.

The 1xEV-DO network is optimized for forward link data applications. The next generation of 1xRTT networks that are being deployed can communicate with voice and data networks but do not process data as efficiently as the networks formed according to the 1xEV-DO standard. Newer networks are also being designed and have evolved from the 1xEV-DO standard, including 1xEV-DV (IS-2000 Release C), which is for transmitting data as well as voice.

In North America, two technologies have been designed as an evolution from 1xRTT. The first technology is 1xEV-DO as mentioned above, which is geared towards data only application and is not backwards compatible to 1xRTT. This solution is designed to offer a user a peak throughput of 2.45 Mb/s in the forward link. The second technology is an evolution of 1xRTT, and is also known as cdma2000 Release C, or 1xEV-DV. This technology is backwards compatible to 1xRTT, and as such can offer voice and data services to the users. The peak rate offered by this second technology is 3.09 Mb/s. These two technologies are able to offer such high peak rates in the wireless channel by a number of design changes and optimizations.

Multiple access modulation techniques are some of the most efficient techniques for utilizing the RF spectrum. Examples of such modulation techniques include TDMA, frequency division multiple access and CDMA. CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique, a signal having the bandwidth of only a few kilohertz can be spread over a bandwidth of more than a megahertz.

Because CDMA networks employ a system in which all transmissions occur in the same frequency band, it is well known that it is important to transmit at the lowest possible power that allows for the delivery of a communication signal at a certain level of accuracy or grade of service criteria. The reason that it is important for base stations and mobile stations to transmit with a minimal level of power on the forward and reverse links is that each transmission adds to the noise level for all other receivers. In addition, if the per user power on the forward link is minimized there is more power available at the sector power amplifier for other users, thereby increasing the capacity of the system. Similarly, on the reverse link, if less power is used, apart from the interference benefits mentioned above, the mobile station can extend its battery life and/or range of transmission. One cost of reducing transmission power levels, however, is that the signal quality degrades with the lower power level.

Allowing signal quality to degrade will reduce transmission power levels, which reduces noise and interference to other users. However, this is unacceptable from a user's perspective when the signal quality degrades past a certain point. Improving signal quality beyond a certain point, on the other hand, does little to improve the user's perception of quality, but would greatly increase transmission power levels, which, in turn, would increase noise and interference to other users, causing their required power levels to increase in response. Ultimately, system throughput capacity is degraded in this scenario. Thus, it is desirable to control transmit power levels above the background noise to maintain a desired signal quality and to avoid unnecessary interference with other users.

While power control is an especially important aspect of every CDMA network, the issue of power control is pertinent in any wireless communication network that is likely to have a significant number of users for the same reasons it is so critical in a CDMA network. Generally, the greater the number of users in a wireless network, the overall noise and interference to other users is greater. For example, a mobile station transmitting on the reverse link to the base station must, at a minimum, transmit at a power level sufficient to overcome thermal noise and background interference (noise) for the communication signals to be received and demodulated by the base station. As more users in the area of the mobile station communicate at the same time, the overall noise level increases thereby increasing a required transmission power level of the mobile station for its reverse link communication signal to successfully reach the base station. As the number of active users in the cell increase, the reverse link loading will increase. This reverse link loading is also known as the rise over thermal (RoT) and is a metric or measurement that represents the total received power in the frequency band over the thermal noise floor.

In multi-user networks having a large number of users wanting access to network resources, the order in which users are allowed to access the network resources for a communication becomes a significant aspect of network design. In general, without scheduling, noise would increase as multiple users attempt to communicate at the same time, limiting each of the users' achievable data rate. If a system is implemented in which users are not scheduled in their attempt to communicate over a channel, then some users may not relinquish resources thereby not allowing others to communicate (or at least communicate on a timely basis). Thus, as a matter of fairness, scheduling algorithms are implemented in communication networks for allowing a more fair use of network resources.

Scheduling also is important to achieve network efficiency and, for example, to maximize network throughput. Thus, as multiple users seek access to a network, a scheduler provides access to maximize network throughput while also considering quality of service considerations, such as the type of service level agreement a user has or even the identity of the user.

In most multi-user wireless communication networks, as well as wired networks, a communication controller schedules communications by the various terminals in the network. In a wireless communication network, a base station controller typically performs the task of scheduling reverse link communications from the mobile stations to the BTSs. While a BTS could easily schedule reverse link communications in its cell, the BTS cannot schedule reverse link communications in adjacent cells serviced by other BTSs. For a mobile station that is in hand-off, meaning that it is communicating with two or more BTSs as it transitions from one cell to another (communicating with one BTS to communicating with another BTS), the scheduling becomes more difficult. Accordingly, most wireless networks are developed to allow the base station controller (BSC) to perform scheduling among the various BTSs because it is able to coordinate the communications there between.

Whenever a base station schedules a reverse link transmission from the mobile station, and more particularly a data packet transmission from a mobile data terminal, it specifies a data rate and a corresponding power level. The data rate and power level are typically related. The base station, as a part of scheduling the reverse link communication, must determine an appropriate power level and, hence, rate to overcome thermal noise as well as overall noise from all communications. In other words, the received signal power level must be able to sustain the data communication given the level of RoT in the system for the scheduling time instant. In addition, the result of granting the transmission of the user must not overcome a specified RoT outage threshold in the system. Overcoming this threshold may increase the probability that other users, such as voice users, in the sector may not be able to close the reverse link reliably even when transmitting at maximum allowed power. One problem with scheduling algorithms that are performed by a base station controller, however, is that the scheduling algorithm may not respond quickly to the bursty nature of packet data transmission. For some communications, a slowly responding scheduling algorithm may be unacceptable because the packet data cannot be scheduled and transmitted fast enough to satisfy its throughput requirements since mobile data terminal stations using packet data resources maintain an always-on connection but tend to use network resources in a burst of packet data. There is a need, therefore, for a method and apparatus to efficiently provide dynamic scheduling of reverse link packet data transmission.

BRIEF SUMMARY OF THE INVENTION

A method and an apparatus of the present invention allows for dynamic resource management in a packet data network to support dynamic scheduling of reverse link packet data transmissions to efficiently support bursty packet data traffic on the reverse link wherein the reverse link transmission of each mobile station is scheduled by the base station infrastructure to support dynamic scheduling operation by the base station. The various embodiments of the invention initiate signaling and control information on the forward link and the reverse link to support the dynamic scheduling of the reverse link transmission. Dynamic scheduling of the reverse link transmission ensures efficient over-the-air resource multiplexing among bursty packet data users.

One method of the present invention includes receiving a PERSISTENCE bit with a transmission grant signal transmitted by a base station wherein the transmission grant signal includes a specified transmission rate. Based on a logic state of the PERSISTENCE bit, the mobile station transmits sub-packets of data packets at one of an incrementally adjusted transmission rate or an autonomous transmission rate. When the PERSISTENCE bit is set to a first logic state (logic zero in one embodiment of the invention), the sub-packets are transmitted at the autonomous transmission rate. If the PERSISTENCE bit is a logic 0, however, the MS may or may not, monitors the RCB for further rate adjustment information. Even if the MS looks at the RCB, the base rate will be no higher than the autonomous rate (instead of the assigned rate). The autonomous transmission rate is the lowest transmission rate the mobile station is allowed to transmit without authorization from the base station. The autonomous transmission rate is set during mobile station initialization but may be adjusted by the base station in overhead signaling messages.

When the PERSISTENCE bit is set to a second logic state (logic one in one embodiment of the invention), the sub-packets are transmitted at an incrementally adjusted transmission rate wherein the incrementally adjusted transmission rate is the specified transmission rate incremented or decremented by a specified value. A rate control bit (RCB) is transmitted by the base station on the forward link and is set to a value of one of a first value, a second value, or a third value, a+1, a 0, or a −1 in the described embodiment of the present invention. When the PERSISTENCE bit is set to the second logic state (logic one in the described embodiment) and the RCB value is a first value (+1 in the described embodiment), the mobile station increments the specified transmission rate by the specified value to produce an incrementally adjusted transmission rate. Conversely, when the RCB has is a third value of (−1 in the described embodiment), the mobile station decrements the incrementally adjusted transmission rate. An RCB second value of (0 in the described embodiment) instructs the mobile station not to adjust the transmission rate.

An alternate embodiment of the present invention includes an ALL_ACID_IND bit that is transmitted with the PERSISTENCE bit in the transmission grant signal in the described embodiment of the invention. The ALL_ACID_IND bit is often also referred to as an ALL_ARQ bit. In this embodiment, the PERSISTENCE bit functions as previously discussed, while the ALL_ACID_IND bit instructs the mobile station to adjust the incrementally adjusted transmission rate for either a single Hybrid Automatic Repeat Request (H-ARQ) channel or all H-ARQ channels. When the ALL_ACID_IND bit is in the first logic state (logic zero in the described embodiment), the mobile station adjusts the transmission rate only for the current H-ARQ channel. Conversely, when the ALL_ACID_IND bit is in the second logic (logic one in the described embodiment), the mobile station adjusts the transmission rate for all H-ARQ channels. The specified transmission rate is adjusted by a specified value based on the value of the RCB wherein the RCB first value (+1 in the described embodiment) prompts the mobile station to increment specified transmission rate, while the RCB third value (−1 in the described embodiment)prompts the mobile station to decrement the specified transmission rate. The RCB second value (0 in the described embodiment) instructs the mobile station to not adjust the transmission rate.

An alternate embodiment of the present invention provides for controlling the reverse link incremental power in the packet data network. In this embodiment, the mobile station uses the RCB in conjunction with a negative acknowledgement (NAK) to adjust a transmission-to-pilot ratio. The transmission-to-pilot ratio is a fixed ratio of the packet data channel power to the pilot channel power. When the mobile station transmits a first sub-packet of a data packet and receives the NAK for the first sub-packet, the mobile station monitors the RCB for the first, second, and third values (+1, 0, −1, respectively, in the described embodiment), in order to change the transmission rate of subsequent sub-packets of the same data packet. When the RCB is at a first value (+1 in the described embodiment), the transmission-to-pilot ratio is increased by a defined value. The mobile station does not adjust the transmission-to-pilot ratio when the RCB is a second value (0 in the described embodiment). The transmission-to-pilot ratio is decreased by the defined value when the RCB is a third value (−1 in the described embodiment).

The above-referenced description of the summary of the invention captures some, but not all, of the various aspects of the present invention. The claims are directed to some of the various other embodiments of the subject matter towards which the present invention is directed. In addition, other aspects, advantages and novel features of the invention will become apparent from the following detailed description of the invention when considered in conjunction with the accompanying drawings.

BRIEF DESCRIPTION OF THE SEVERAL VIEWS OF THE DRAWINGS

FIGS. 3A and 3B illustrate graphs of traffic-to-pilot ratio adjustment according to one embodiment of the present invention;

FIGS. 4A and 4B are diagrams of H-ARQ sequences for changing the transmission rate and traffic-to-pilot ratio according to one embodiment of the present invention;

FIGS. 5A and 5B are diagrams of H-ARQ sequences for transmission rate adjustment according to one embodiment of the present invention;

FIGS. 6A and 6B illustrate an alternate embodiment of the present invention;

DETAILED DESCRIPTION OF THE INVENTION

Figure 1:
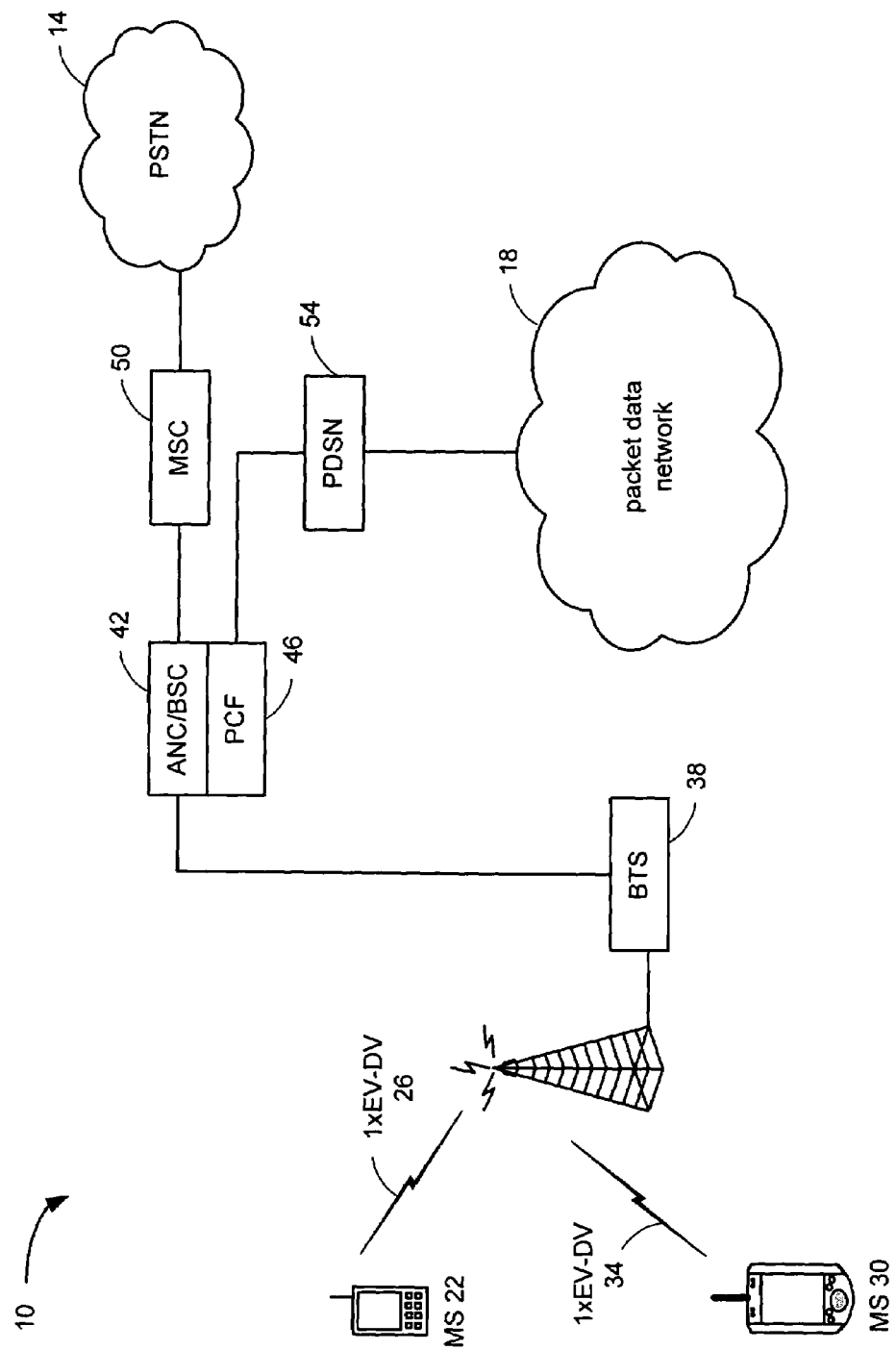
FIG. 1 is a functional block diagram of a communication network formed according to one embodiment of the present invention.

FIG. 1 is a functional block diagram of a communication network formed according to one embodiment of the present invention. As may be seen, communication network 10 includes mobile stations (MS) that are coupled to operatively communicate over a voice or a data packet network. For example, communication network 10 creates an ability for the mobile stations to communicate with a Public Switched Telephone Network (PSTN) 14 or with packet data network 18. A mobile station, MS 22, is engaged in a data call (data packet session) according to 1xEV-DV protocols over a wireless communication link, shown generally at 26. Similarly, MS 30 is engaged in a voice session over a wireless communication link, shown generally at 34, with BTS 38 according to 1xEV-DV protocols. BTS 38 is generally coupled to communicate with ANC/BSC 42 (or with packet control function cards there within).

As is understood by one of average skill in the art, access network controllers (ANC) and base station controllers (BSC) have similar functionality. Moreover, Packet Control Function (PCF) cards can be installed either within the BSC or within the ANC according to the wireless protocol the PCF is to communicate with. It is understood by one of average skill in the art that the BSC and ANC elements may readily be formed as stand alone units, but are shown herein as combined systems for illustration. Within ANC/BSC 42, wireless network cards are included to facilitate communications with mobile stations of differing protocols and types. ANC/BSC 42 further includes a PCF 46 for communicating with MS 22 utilizing 1xEV-DV protocols.

As may be seen, PCF 46 is processing data packets for 1xEV-DV devices (such as MS 22 and Ms 30) and is also coupled directly to a Packet Data Serving Node (PDSN) 54 for routing packet data to packet data network 18. Thus, MS 22 that communicates over wireless communication link 26 according to 1xEV-DV communication protocols, communicates with BTS 38 and with PCF 46 formed within ANC/BSC 42. It is understood, of course, that PCF 46 may readily be formed as a distinct device rather than within a rack of ANC/BSC 42. Moreover, PCF 46 may communicate with MS 22 through distinct radio equipment and, thus, through a BTS other than BTS 38 as shown herein.

As may further be seen, ANC/BSC 42 is coupled to a Mobile Switching Center (MSC) 50 for routing voice calls from MS 30 to PSTN 14 utilizing 1xEV-DV protocols. Accordingly, calls routed through MSC 50 are directed either to other MSCs (not shown herein) or to external networks by way of PSTN 14.

Using the described embodiments of the present invention, ANC/BSC 42 dynamically schedules reverse link transmissions for MS 22 and MS 30. ANC/BSC 42 monitors the RF environment and sets one of the PERSISTENCE bit and the ALL_ACID_IND bit to incrementally adjust the reverse link specified transmission rate or to instruct MS 22 and/or MS 30 to fall back to the autonomous rate. Additionally, ANC/BSC 42 adjusts the traffic-to-pilot ratio to optimize the reverse link incremental power in the sectors served by ANC/BSC 42. Under the current standards, transmission rates are actually specified by a base station in terms of a traffic to pilot power ratio wherein the mobile station translates such specified power ratio to a corresponding transmission rate.

Figure 2:
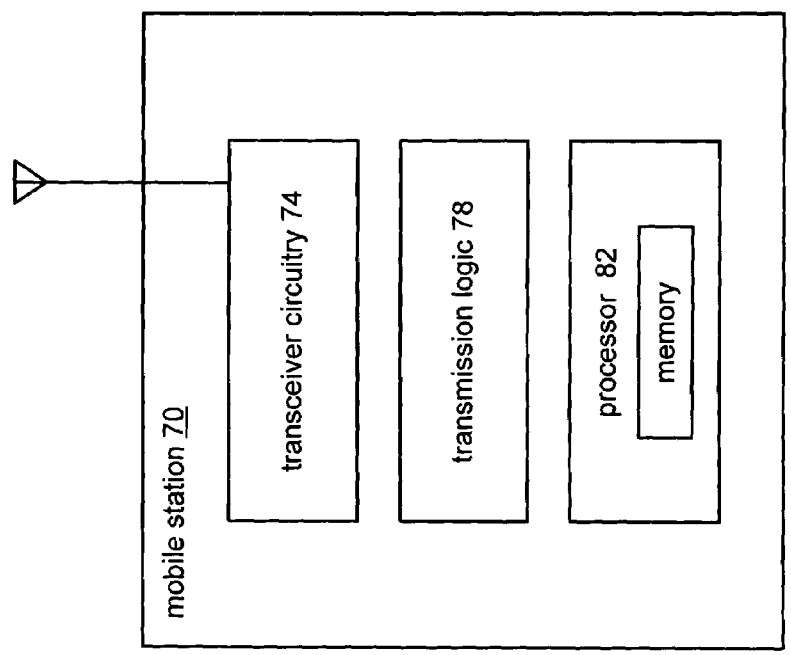
FIG. 2 is a functional block diagram of a mobile station according to one embodiment of the present invention.

FIG. 2 is a functional block diagram of a mobile station according to one embodiment of the present invention. Mobile station 70 comprises transceiver circuitry 74, transmission logic 78 and a processor 82. Transceiver circuitry 74 includes transmitter and receiver circuitry, including modulation/demodulation circuitry, for transmitting and receiving voice and/or packet data. Processor 82, including a memory for storing operational logic and for temporary data storage, sends data to and receives data from transceiver circuitry 74. Additionally, processor 82 adjusts the modulation type and transmitted power of mobile station 70 according to control information received from a base station (not shown). In the described embodiment, transceiver circuitry 74 can operate at one of three modulation formats in the 1xEV-DV protocols: Quadrature Phase Shift Keying (QPSK), 8-ary Phase Shift Keying (8-PSK), and 16-Quadrature Amplitude Modulation (16-QAM). The choice of modulation format and coding are varied dynamically according to the RF environmental conditions. This Adaptive Coding and Modulation (ACM) maximizes the use of the RF spectrum by optimizing the choice of modulation and coding rates. One of average skill in the art may readily implement the teachings of the present embodiment utilizing other modulation formats, however.

Transmission logic 78 adjusts reverse link transmissions, including the transmission rate and a traffic-to-pilot ratio according to one of a PERSISTENCE bit and an ALL_ACID_IND bit received over a forward packet data channel.

In one embodiment of the present invention, MS 70 is operable to adjust the transmission-to-pilot ratio of the packet data channel in relation to the reverse link pilot channel after a transmitted sub-packet of a data packet receives a negative acknowledge (NAK) from the BS. Data packets are divided into sub-packets and transmitted sequentially with a delay period between each transmission in order to provide an ample window for receiving an ACK or NAK. Sub-packets of a data packet are generated by turbo coding the data packet at a rate of 1/N, where N is an integer, and interleaving the coded data packet. The coded interleaved data packet is then divided into sub-packets wherein each sub-packet further receives parity bits for error detection. Each sub-packet is identified with a sub-packet identification. A first sub-packet carries the most important information about the data packet, so it is usually sent first. Thereafter, the remaining sub-packets can be sent if additional transmissions are needed. The additional transmissions of sub-packets are needed if the base station sends a NAK after transmission of the sub-packet indicating the BS could not decode the sub-packet. Typically the BS is operable to reconstruct an entire data packet from a combination of a sub-packet and the parity bits. When a NAK is received from the BS, transmission logic 78 examines the RCB for the RCB value that indicates an adjustment of the transmission-to-pilot ratio. When the RCB is a first value (+1 in the described embodiment), the transmission logic prompts the processor to increment an incrementally adjusted transmission rate. The incrementally adjusted transmission rate is the specified transmission rate received in the transmission grant signal adjusted by a defined value. Thus, when the RCB is a first value, the incrementally adjusted transmission rate is increased by the defined value. If no adjustment to the transmission-to-pilot ratio is required, the RCB value is set to a second value (0 in the described embodiment). Finally, when the RCB value is a third value (−1 in the described embodiment), the transmission logic prompts the processor to decrement the incrementally adjusted transmission rate by the defined value. In any of these cases, adjustments to the transmission to pilot ratio are made for subsequent transmissions of the sub-packets.

In one aspect of the present invention, the transmission logic is operable to interpret a PERSISTENCE bit that is included with the transmission grant signal to indicate mobile station 70 should transmit at one of an autonomous transmission rate or the incrementally adjusted transmission rate based upon the logic state of the PERSISTENCE bit. The autonomous transmission rate is the lowest transmission rate mobile station 70 is allowed to transmit without authorization from the base station. The transmission grant signal includes a 4-bit rate field that defines the transmission rate for mobile station 70. Processor 82 decodes the rate field and prompts transceiver circuitry 74 accordingly. Transmission logic 78 evaluates the PERSISTENCE bit logic state and prompts processor 82 to set the transceiver circuitry 74 transmission rate to transmit sub-packets of a second data packet at one of the autonomous transmission rate or the incrementally adjusted transmission rate. Transmission logic 78 evaluates the logic state of the PERSISTENCE bit and prompts transceiver circuitry 74 via processor 82 to transmit at the autonomous transmission rate when the PERSISTENCE bit is a first logic state (logic zero in the described embodiment). When transmission logic 78 evaluates the logic state of the PERSISTENCE bit as the second logic state (logic one in the described embodiment), the transmission logic 78 further looks at the value of the RCB. If the value of the RCB is the first value (+1 in the described embodiment), transmission logic 78 prompts processor 82 to increment the incrementally adjusted transmission rate by the specified value. Conversely, if the value of the RCB is the third value (−1 in the described embodiment), transmission logic 78 prompts processor 82 to decrement the incrementally adjusted transmission rate by the specified value. If the value of the RCB is the second value (0 in the described embodiment), then the incrementally adjusted transmission rate is not adjusted. Adjustments to the transmission rate based upon the received RCB value occur for subsequent transmissions of a sub-packet portion as described in greater detail herein.

In one embodiment of the present invention, the transmission grant signal includes the PERSISTENCE bit and an ALL_ACID_IND bit. When the PERSISTENCE bit is in the first logic state (logic zero in the described embodiment), transmission logic 78 prompts transceiver circuitry 74 via processor 82 to transmit sub-packets of the second data packet at the autonomous transmission rate. When the PERSISTENCE bit is in the second logic state (logic one in the described embodiment), mobile station 70 transmits sub-packets at the incrementally adjusted transmission rate in the method as previously described. However, logic 78 incrementally adjusts the transmission rate for either all H-ARQ channels or only the current H-ARQ channel based on a logic state of the ALL_ACID_IND bit received from the BS. If the ALL_ACID_IND bit is in a first logic state (logic zero in the described embodiment), transmission logic 78 prompts processor 82 to incrementally adjust the transmission rate for the current H-ARQ channel only. If the ALL_ACID_IND bit is in a second logic state (logic one in the described embodiment), however, transmission logic 78 prompts processor 82 to incrementally adjust the transmission rate for all H-ARQ channels. The addition of the ALL_ACID_IND bit to the transmission grant channel allows mobile station 70 to transmit each H-ARQ channel at the highest transmission rate available according to current conditions of the RF environment.

FIGS. 3A and 3B illustrate graphs of traffic-to-pilot ratio adjustment for the reverse link pilot channel according to one embodiment of the present invention. As can be seen in FIG. 3A, a reverse link pilot channel is transmitted at a specified reverse link power level, as shown at 90. A forward link power control channel controls the power of the reverse link pilot channel. A packet data channel power, shown as 94, is transmitted at a fixed ratio relative to the reverse link pilot channel. The BS set the reverse link power according to the specified transmission rate. Thus, the traffic-to-pilot ratio is the ratio of the packet data channel power to the reverse link pilot channel power. In one embodiment of the present invention, the MS adjusts the packet data channel power by adjusting the traffic-to-pilot ratio by monitoring and evaluating the value of the RCB. When the NAK is received for a first sub-packet of a data packet, the mobile station interprets the value of the RCB as a traffic-to-pilot ratio adjustment control signal instead of a transmission rate adjustment control signal during re-transmissions of sub-packets of the same data packet. When the RCB value is the first value (+1 in the describe embodiment), the mobile station increments the traffic-to-pilot ratio (reverse link), effectively boosting the packet data channel power. When the RCB value is the third value (−1 in the describe embodiment), the mobile station decrements the traffic-to-pilot ratio. The RCB third value (0 in the describe embodiment) indicates no change in the traffic-to-pilot ratio. Thus, the RCB signal field is used to transmit one of a plurality of signals according to specified conditions. The mobile station, according to the present invention, is operable to properly interpret and respond to the data within the RCB signal field.

FIG. 3B illustrates a change in the traffic-to-pilot ratio. In the example of FIG. 3B, the RCB first value (+1 in the describe embodiment) has caused an increase in the traffic-to-pilot (reverse link) ratio which effectively increases the packet data channel power, shown as 98, since the pilot channel power, shown as 90, does not change and the traffic-to-pilot ratio has increased from the previous level, shown as 94, to the increased level, shown as 98. This embodiment of the present invention gives the base station the flexibility to manage the Rise-over-thermal (RoT) and the MS traffic-to-pilot ratio during re-transmission.

FIGS. 4A and 4B are diagrams of H-ARQ sequences for changing the transmission rate and traffic-to-pilot ratio according to one embodiment of the present invention. As was previously discussed, the MS divides data packets into sub-packets prior to transmission. Data packets are transmitted on three H-ARQ channels with the sub-packets of the same data packet transmitted on the same H-ARQ channel. The H-ARQ sequences of FIGS. 4A and 4B illustrate the interleaving of sub-packets. A first data packet, A, is divided into sub-packets A1, A2, and A3. A second data packet, B, is divided into sub-packets B1, B2, and B3, while a third data packet, C, is divided into sub-packets C1, C2, and C3. The first sub-packets of each data packet are transmitted first (A1, B1, C1) followed by the second sub-packets (A2, B2, C2) and third sub-packets (A3, B3, C3). All sub-packets are shown in FIGS. 4A and 4B to illustrate the embodiment of the present invention, although the sequence of sub-packets of a data packet terminates as soon as an ACK is received from the base station indicating the base station has successfully decoded the sub-packet.

In the example of FIGS. 4A and 4B, if the MS receives a NAK for the first sub-packet A1 from the base station indicating the base station did not successfully decode the sub-packet, the MS interprets an ROB bit as traffic-to-pilot adjustment signal for a subsequent sub-packet. If the MS receives an ACK for the first sub-packet A1 from the base station indicating the base station did successfully decode the sub-packet, the MS interprets an RCB bit as transmission rate setting signal for a subsequent sub-packet of the next data packet. The MS receives the NAK and thereafter interprets the RCB value as an indication to adjust the traffic-to-pilot ratio for the current H-ARQ channel. The MS interprets the RCB first value (+1 in the describe embodiment) as a signal to increment the traffic-to-pilot ratio, while the RCB third value (−1 in the describe embodiment) indicates a decrement to the traffic-to-pilot ratio. The RCB second value (0 in the describe embodiment) indicates no change in the traffic-to-pilot ratio. Once an ACK is received for the H-ARQ sequence, the transmission data rate is set to one of the specified transmission rate or the autonomous transmission rate based on the logic state of the PERSISTENCE bit. In one embodiment, the H-ARQ channel rate and power are adjusted for all sub-packets H-ARQ interleaved channels. In an alternate embodiment, they are adjusted only for the current sub-packet H-ARQ interleaved channel.

FIGS. 5A and 5B are diagrams of H-ARQ sequences for transmission rate adjustment according to one embodiment of the present invention. In this embodiment, the logic state of the PERSISTENCE bit is used to set the transmission rate for a following packet to one of the autonomous transmission rate or the specified transmission rate. The autonomous rate is a defined transmission rate assigned by the BS at MS initialization and is the lowest transmission rate the MS is allowed to use without authorization from the BS. The specified transmission rate is the transmission rate set by the BS in the 4-bit rate field of the transmission grant signal. The MS uses the 4-bit rate field to determine the transmission rate if the transmission rate in not set for an autonomous rate mode of operation. The PERSISTENCE bit is a one-bit field in the transmission grant signal and is used to instruct the MS to monitor the RCB or instruct the MS to drop back to the autonomous transmission rate at the end of the current H-ARQ sequence. In the example of FIG. 5A, the PERSISTENCE bit is set to the first logic state (logic zero in the describe embodiment) thereby prompting the mobile station to drop back to the autonomous mode after successfully delivering the sub-packet as indicated by a received ACK. As shown in FIG. 5A, the MS transmits the H-ARQ sequences and then monitors transmissions from the BS for one of an acknowledge (ACK) signal or negative acknowledge (NAK) signal. The PERSISTENCE bit set to a first logic state (logic zero in the described embodiment) in the grant rate channel indicates a switch to the autonomous transmission rate at the end of the current sub-packet sequence. If the MS receives a NAK after transmitting, the MS will not change the transmission rate for the sequence of sub-packets of the same data packet so sub-packet A2 is transmitted at the previous transmission rate. When the ACK is received for sub-packet A2, ARQ1 falls back to the autonomous rate for the packets following the received ACK.

The BS acknowledges sub-packet B1 of data packet B so ARQ2 falls back to the autonomous transmission rate for all data packets that are transmitted after data packet B. After fall back, ARQ2 will continue to transmit at the autonomous rate, therefore the first sub-packets (E1 and F1) of data packet E and data packet F, respectively, are transmitted at the autonomous transmission rate. When data packet C is acknowledged, ARQ3 falls back to the autonomous transmission rate for the next data packet transmitted on ARQ3. If the PERSISTENCE bit is a logic 0, however, the MS may or may not, monitors the RCB for further rate adjustment information. Even if the MS looks at the RCB, the base rate will be no higher than the autonomous rate (instead of the assigned rate).

FIG. 5B illustrates the incremental adjustment of the specified transmission rate when the PERSISTENCE bit is set to a second logic state (logic one in the described embodiment). As can be seen, the MS is transmitting an H-ARQ sequence wherein the first sub-packet (A1) of data packet A is transmitted at the previously specified transmission rate. Because, in this example, sub-packet A1 is negatively acknowledged (NAK) by the base station, the mobile station continues to transmit subsequent sub-packets of data packet A until a positive acknowledgement (ACK) is received. Once the ACK is received, the PERSISTENCE bit second logic state (logic one in one embodiment) prompts the MS to monitor the RCB for transmission rate adjustment. Each H-ARQ channel will monitor the RCB for that channel and adjust the specified transmission rate as indicated by the value of RCB. For example, ARQ2 begins transmitting sub-packet B1 of data packet B while monitoring the RCB for ARQ2. In this example, the RCB is a third value (−1 in the describe embodiment), instructing the mobile station to decrement a specified transmission rate by the defined value. The defined increment and decrement values are established during mobile station initialization, but may be changed by the base station in forward link signaling messages.

Continuing with the example of FIG. 5B, the ARQ2 channel transmits the first sub-packet E1 of data packet E while monitoring the RCB for ARQ2. The RCB first value (+1 in the describe embodiment) instructs the mobile station to increment the specified transmission rate by the defined value. The inclusion of the PERSISTENCE bit in the grant rate channel allows the base station to dynamically increment or decrement the transmission rate to adapt to the changing RF environment, thereby maintaining a tighter control on RoT and background noise. The RCB second value (0 in the describe embodiment) instructs the mobile station to maintain the specified transmission rate at the current transmission rate. As is known to one of average skill in the art, the described embodiment values of +1, −1 and 0 of the RCB may be implemented in any manner consistent with forward link transmissions.

FIGS. 6A and 6B illustrate an alternate embodiment of the present invention. In this embodiment, two bits are added to the grant rate channel, namely, the PERSISTENCE bit and an ALL_ACID_IND bit. The ALL_ACID_IND bit instructs the mobile station to adjust the transmission rate for all H-ARQ sequences or only for the current H-ARQ sequence, depending on the logic state of the ALL_ACID_IND bit. For the following, operation is based upon the ALL_ACID_IND bit set to logic one in the described embodiment, although one of average skill in the art recognizes an alternate logic scheme can be implemented to achieve identical results. For example, in FIG. 6A the first H-ARQ channel, ARQ1, receives an ACK from the base station for sub-packet A1 of data packet A and begins to monitor the RCB for an ARQ1 transmission rate adjustment. Sub-packets B1 and C1 of data packet B and data packet C, respectively, will be transmitted at the specified transmission rate until the RCB for H-ARQ channels ARQ2 and ARQ3 indicates the base station is requesting a change in the specified transmission rate. The mobile station detects the RCB on the ARQ1 channel is the first value (+1 in the describe embodiment) indicating a request to increment the specified transmission rate. The mobile station increments the ARQ1 specified transmission rate by the specified value. Due to the ALL_ACID_IND bit having a first logic state (logic zero in the describe embodiment), the mobile station will only switch the specified transmission rate for the H-ARQ channel only if the RCB for that channel indicates a change in the specified transmission rate. In the example of FIG. 6A, ARQ2 transmits sub-packet E1 of data packet E at the specified transmission rate until the RCB, for ARQ2, is one of either the first or third values (+1 or −1, respectively in the describe embodiment). Similarly, ARQ3 channel transmits sub-packet C1 of data packet C and sub-packets F1 and F2 of data packet F at the specified transmission rate.

FIG. 6B illustrates the operation of H-ARQ sequences when the PERSISTENCE bit is in the second logic state and the ALL_ACID_IND bit is also in the second logic state. When the ALL_ACID_IND bit is in the second logic state (logic one in the describe embodiment), the mobile station adjusts all H-ARQ sequences based on any H-ARQ channel RCB having one of the first value or the third value (+1 or −1, respectively, in the describe embodiment). For example, after transmitting sub-packet A1 of data packet A, the mobile station receives an ACK indicating the base station successfully decoded the sub-packet and the mobile station continues to monitor the RCB for the transmission rate adjustment. When the mobile station detects the ARQ1 channel RCB at the first value (+1 in the describe embodiment), the mobile station increments the specified transmission rate by the defined value, producing the incrementally adjusted transmission rate. Since the ALL_ACID_IND bit is in the second logic state (logic one in the described embodiment), all H-ARQ channel transmission rates are incremented at the same time. Therefore, the incrementally adjusted transmission rate for ARQ1 channel is also applied to ARQ2 and ARQ3. When the mobile station transmits sub-packet B1 of data packet B, the ARQ2 transmission will be. at the incrementally adjusted transmission rate. Thereafter, ARQ3 channel will transmit sub-packet C1 of data packet C at the incrementally adjusted transmission rate. This embodiment with the addition of ALL_ACID_IND bit allows the mobile station to either increment a single H-ARQ channel or all H-ARQ channels based upon the current conditions in the RF environment. This dynamic adjustment of the specified transmission rate gives the base station greater flexibility in managing the packet data resources in its domain.

The assigned rates and incremental rate adjustments of the embodiments described herein represent a specified maximum rate at which a MS may transmit during a particular time slot. The MS may not, however, have enough packets awaiting transmission to achieve the maximum rate or may not have enough power available to sustain the maximum transmission rate.

Figure 7:
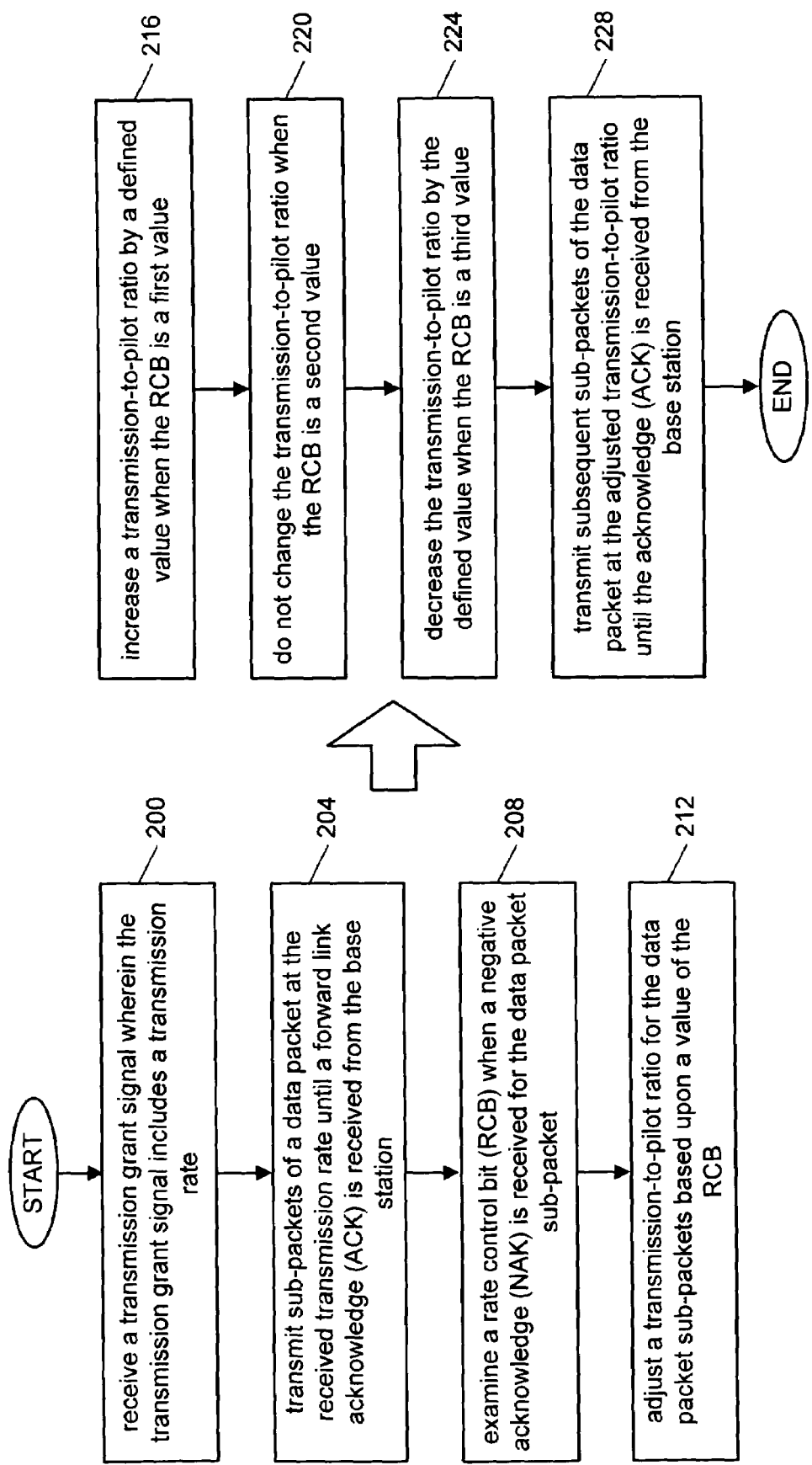
FIG. 7 is a flowchart for a method of controlling reverse link incremental power in a packet data network according to one embodiment of the present invention.

FIG. 7 is a flowchart for a method of controlling reverse link incremental power in a packet data network according to one embodiment of the present invention. A mobile station receives a transmission grant signal wherein the transmission grant signal includes a transmission rate (step 200). The transmission rate is defined in a 4-bit rate field in the transmission grant signal transmitted by the base station. The mobile station transmits sub-packets of a data packet at the received transmission rate until an acknowledge (ACK) is received from the base station (step 204). As was previously described, the data packet is coded and interleaved before being divided into sub-packets. Each sub-packet further receives a plurality of parity bits to aid in error detection. The ACK transmitted by the base station acknowledges successful decoding of the sub-packet and further signals the mobile station to transmit a next data packet. As is known to one of average skill in the art, the contents of a data packet may be recreated by decoding the contents of a successfully received sub-packet. If, however, an ACK is not received from the base station, the method includes examining the RCB when a negative acknowledge (NAK) is received for the data packet sub-packet (step 208). When a NAK is received for the sub-packet, the method provides for interpreting the RCB as an adjustment indicator for the transmission-to-pilot ratio. Accordingly, the method adjusts the transmission-to-pilot ratio for the data packet sub-packets based upon a value of the RCB (step 212). Thereafter, the transmission-to-pilot ratio is increased by a defined value when the RCB is a first value (step 216). The defined value is defined during call setup when the mobile station first establishes communication with the base station. The transmission-to-pilot ratio is not changed when the RCB is a second value (step 220). Alternatively, the transmission-to-pilot ratio is decreased by the defined value when the RCB is a third value (step 224). Subsequent sub-packets of the data packet are transmitted at the adjusted transmission-to-pilot ratio (reverse link pilot ratio) until the ACK is received from the base station (step 228).

Figure 8:
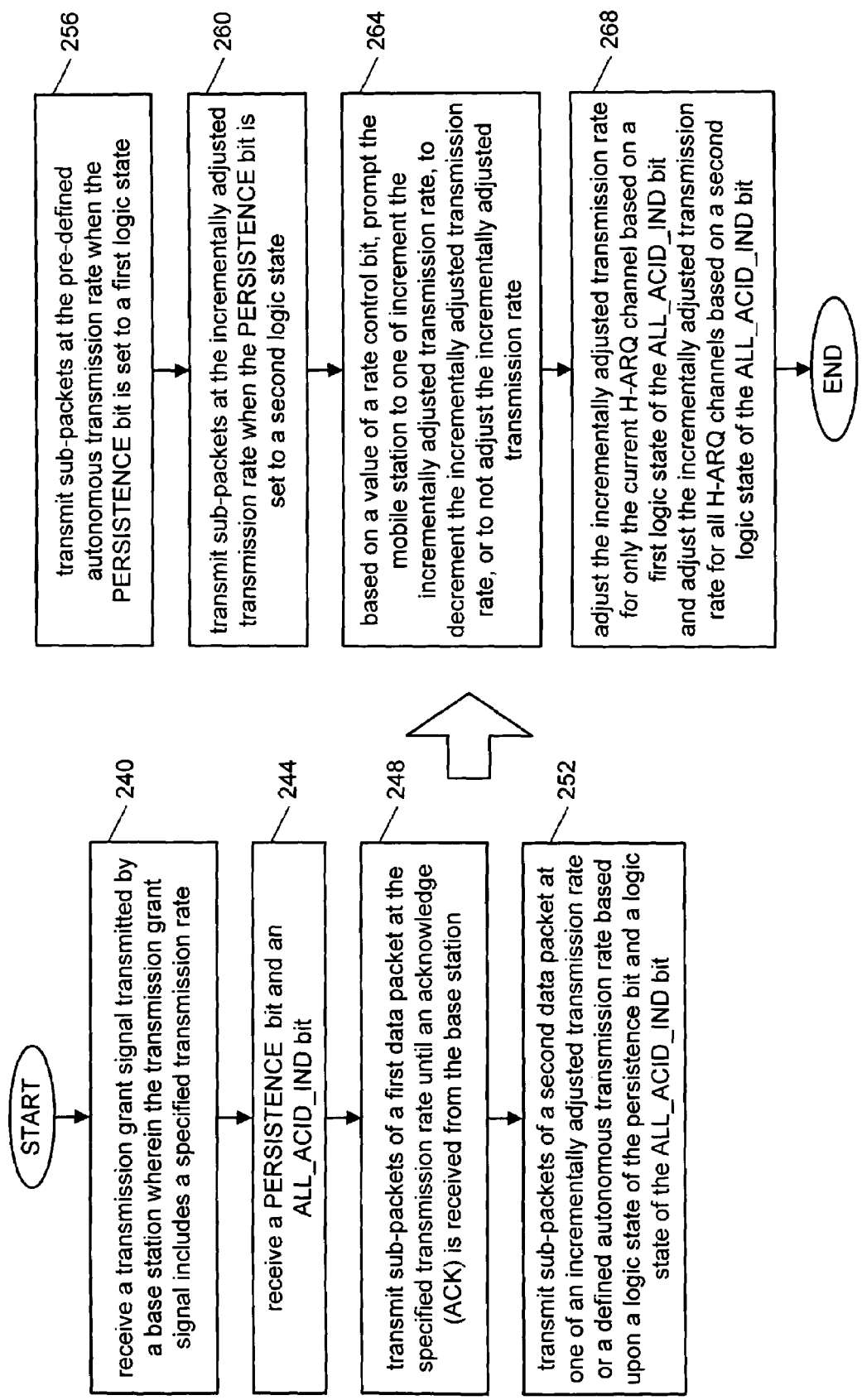
FIG. 8 is a flowchart of a method for setting a reverse link transmission rate for a mobile station in a packet data network.

FIG. 8 is a flowchart of a method for setting a reverse link transmission rate for a mobile station in a packet data network. A mobile station receives a transmission grant signal transmitted by a base station wherein the transmission grant signal includes a specified transmission rate (step 240). The transmission grant signal includes a 4-bit rate field that determines the specified transmission rate. The specified transmission rate is selected by the base station to optimize packet data throughput based on the current RF environment.

The method further includes receiving a PERSISTENCE bit and an ALL_ACID_IND bit (step 244) wherein the PERSISTENCE bit and the ALL_ACID_IND bit are included in the transmission rate grant signal. Thereafter, sub-packets of a first data packet are transmitted at the specified transmission rate until an acknowledge (ACK) is received from the base station (step 248). The ACK transmitted by the base station indicates successful decoding of the sub-packet and further prompts the mobile station that the remaining sub-packets of the first data packet can be discarded and a new data packet can be transmitted. Thereafter, sub-packets of a second data packet are transmitted at one of an incrementally adjusted transmission rate or an defined autonomous transmission rate based on a logic state of the PERSISTENCE bit and a logic state of the ALL_ACID_IND bit (step 252).

The autonomous transmission rate is the lowest transmission rate that the mobile station can transmit without authorization from the base station and is established at mobile station initialization. The incrementally adjusted transmission rate is the specified transmission rate determined by the transmission grant signal adjusted by a defined increment or decrement. The sub-packets of the second data packet are transmitted at the defined autonomous rate when the PERSISTENCE bit is set to a first logic state (step 256). By setting the PERSISTENCE bit to the first logic state, a mobile station is authorized to transmit at the autonomous rate as soon as data is received in a mobile station buffer. Alternatively, the sub-packets are transmitted at the incrementally adjusted transmission rate when the PERSISTENCE bit is set to a second logic state (step 260).

When the PERSISTENCE bit is set to the second logic state, the method uses a value of a rate control bit (RCB) to prompt the mobile station to increment the incrementally adjusted transmission rate, to decrement the incrementally adjusted transmission rate, or to not adjust the incrementally adjusted transmission rate (step 264). The incrementally adjusted transmission rate is incremented when the RCB is a first value. Conversely, the incrementally adjusted transmission rate is decremented when the RCB value is a third value. The incrementally adjusted transmission rate is not adjusted when the RCB value is a second value. Thereafter, the mobile station incrementally adjusts the incrementally adjusted transmission rate for H-ARQ channels based on a logic state of the ALL_ACID_IND bit. More specifically, the mobile station incrementally adjusts the incrementally adjusted transmission rate for only the current H-ARQ channel based on a first logic state of the ALL_ACID_IND bit and incrementally adjusts the incrementally adjusted transmission rate for all the H-ARQ channel based on a second logic state of the ALL_ACID_IND bit (step 268). In the described embodiment, the H-ARQ first logic state is defined to be logic one, while the H-ARQ second logic state is defined to be logic zero. The addition of the ALL_ACID_IND bit to the transmission grant signal allows flexibility in setting the transmission rate for the H-ARQ channels based on the current RF environment.

Figure 9:
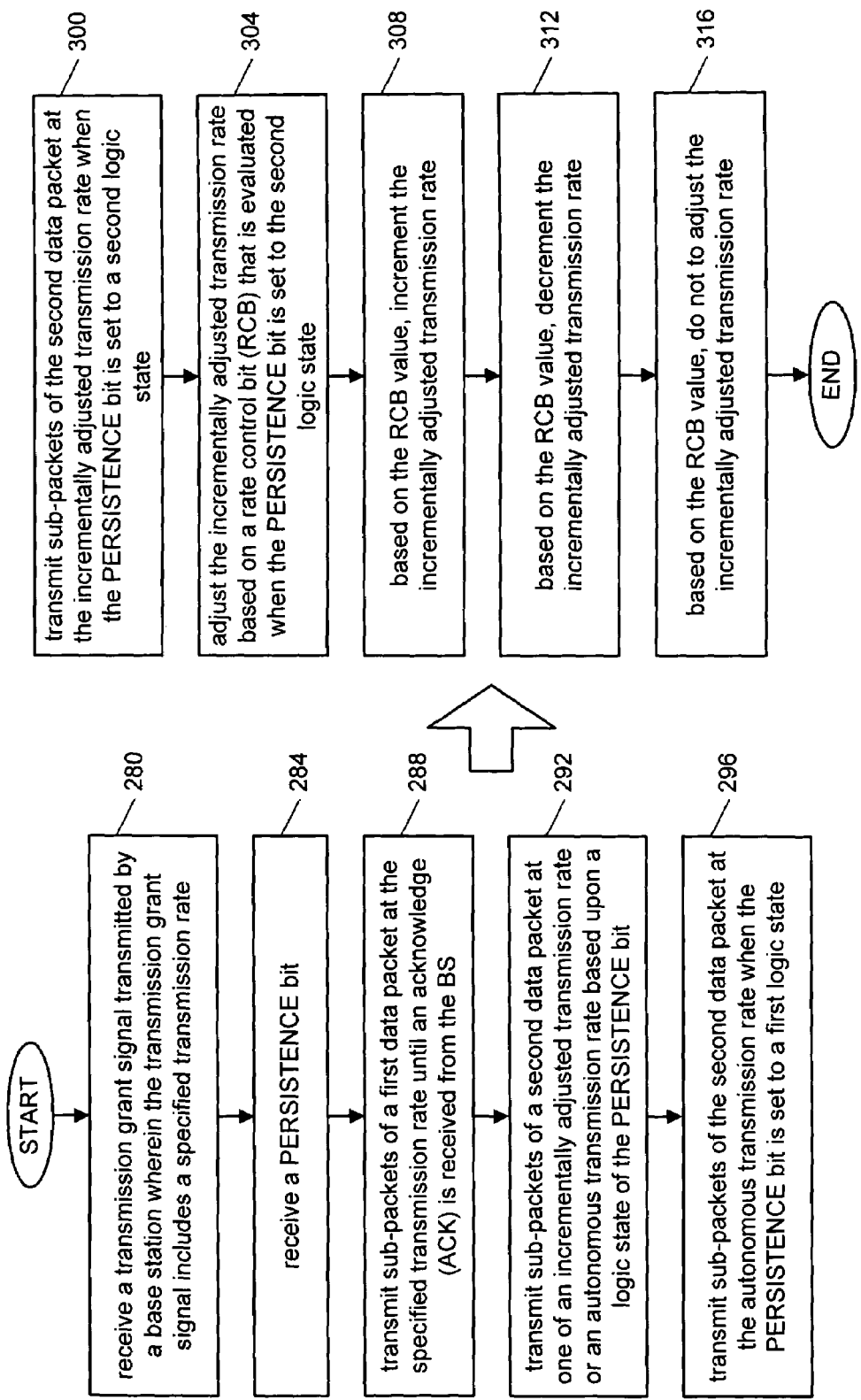
FIG. 9 is a flowchart of a method for setting a reverse link transmission rate for a mobile station in a packet data network.

FIG. 9 is a flowchart of a method for setting a reverse link transmission rate for a mobile station in a packet data network. A transmission grant signal transmitted by a base station includes a specified transmission rate (step 280). Additionally, a PERSISTENCE bit is received with the rate grant signal (step 284). Sub-packets of a first data packet are transmitted at the specified transmission rate until an acknowledge (ACK) is received from the base station (step 288). Thereafter, sub-packets of a second data packet are transmitted at one of an incrementally adjusted transmission or an autonomous transmission rate based on a value of the PERSISTENCE bit (step 292). The sub-packets of the second data packet are transmitted at the autonomous transmission rate when the PERSISTENCE bit is set to a first logic state (step 296). The sub-packets of the second data packet are transmitted at the incrementally adjusted transmission rate when the PERSISTENCE bit is set to a second logic state (step 300). When the PERSISTENCE bit is set to the second logic state, the incrementally adjusted transmission rate is adjusted based on a value of a rate control bit (RCB) (step 304). Thereafter, the RCB value prompts the mobile station to increment the incrementally adjusted transmission rate (step 308), or to decrement the incrementally adjusted transmission rate (step 312), or prompts the mobile station not to adjust the incrementally adjusted transmission rate (step 316). The incrementally adjusted transmission rate is incremented when the RCB is a first value. Conversely, the incrementally adjusted transmission rate is decremented when the RCB value is a third value. The incrementally adjusted transmission rate is not adjusted when the RCB value is a second value.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for setting a reverse link transmission rate for a mobile station (MS) in a data packet network, comprising:
   receiving a transmission grant signal transmitted by a base station (BS) wherein the transmission grant signal includes a specified transmission rate;
   receiving a PERSISTENCE bit;
   transmitting sub-packets of a first data packet at the specified transmission rate as specified in a commanded traffic to pilot power ratio received from a base station until an acknowledge (ACK) is received from the BS;
   transmitting sub-packets of a second data packet at one of an incrementally adjusted transmission rate or an autonomous transmission rate based upon a logic state of the PERSISTENCE bit;
   wherein sub-packets of the second data packet are transmitted at one of the autonomous transmission rate or an adjusted rate based on the autonomous transmission rate when the PERSISTENCE bit is set to a first logic state;
   wherein the sub-packets of the second data packet are transmitted at the incrementally adjusted transmission rate when the PERSISTENCE bit is set to a second logic state; and
   wherein the incrementally adjusted transmission rate is adjusted based on a rate control bit (RCB) that is evaluated when the PERSISTENCE bit is set to the second logic state.

2. The method of claim 1 wherein the RCB having an RCB value that prompts the MS to increment the incrementally adjusted transmission rate.

3. The method of claim 2 wherein the RCB having an RCB value that prompts the MS to decrement the incrementally adjusted transmission rate.

4. The method of claim 3 wherein the RCB having an RCB value that prompts the MS not to adjust the incrementally adjusted transmission rate.

5. The method of claim 1 wherein the transmission grant signal further includes an ALL_ACID_IND bit.

6. The method of claim 5 wherein the MS incrementally adjusts only the current H-ARQ channel based on a first logic state of the ALL_ACID_IND bit and incrementally adjust all the H-ARQ channels based on a second logic state of the ALL_ACID_IND bit.

7. The method of claim 1 wherein the MS evaluates a rate control bit for transmission-to-pilot ratio adjustment when a negative acknowledge (NAK) is received from the BS for the sub-packet of the first data packet.

8. A method for setting a reverse link transmission rate for a mobile station (MS) in a packet data network, comprising:
   receiving a transmission grant signal transmitted by a base station (BS) wherein the transmission grant signal includes a specified transmission rate;
   receiving a PERSISTENCE bit and an ALL_ACID_IND bit;
   transmitting sub-packets of a first data packet at the specified transmission rate as specified in a commanded traffic to pilot power ratio received from a base station until an acknowledge (ACK) is received from the BS; and
   transmitting sub-packets of a second data packet at one of an incrementally adjusted transmission rate or a defined autonomous transmission rate based upon a logic state of the PERSISTENCE bit and a logic state of the ALL_ACID_IND bit.

9. The method of claim 8 wherein the sub-packets of one of the first data packet and of the second data packet are transmitted at one of the autonomous transmission rate or an adjusted rate based on the autonomous transmission rate when the PERSISTENCE bit is set to a first logic state.

10. The method of claim 9 wherein the sub-packets of one of the first data packet and of the second data packet are transmitted at the incrementally adjusted transmission rate when the PERSISTENCE bit is in a second logic state.

11. The method of claim 10 wherein a value of a rate control bit (RCB) prompts the MS to one of incrementing the incrementally adjusted transmission rate, or decrementing the incrementally adjusted transmission rate, or not adjusting the incrementally adjusted transmission rate.

12. The method of claim 11 wherein the MS incrementally adjusts the incrementally adjusted transmission rate for only the current H-ARQ channel based on a first logic state of the ALL_ACID_IND bit and incrementally adjusts the incrementally adjusted transmission rate for all the H-ARQ channels based on a second logic state of the ALL_ACID_IND bit.

13. A method for controlling reverse link incremental power in a packet data network, comprising:
   receiving a transmission grant signal transmitted by a base station (BS) wherein the transmission grant signal includes a transmission rate;
   transmitting sub-packets of a data packet at the received transmission data rate until a forward link acknowledge (ACK) is received from the BS;
   examining a rate control bit (RCB) when a negative acknowledge (NAK) is received for a sub-packet of the data packet;
   adjusting a transmission-to-pilot ratio for sub-packets of the data packet based upon a value of the RCB; and transmitting subsequent sub-packets of the data packet at the adjusted transmission-to-pilot ratio until the acknowledge (ACK) is received from the base station (BS).

14. The method of claim 13 wherein the transmission-to-pilot ratio is increased by a defined value when the RCB is a first value.

15. The method of claim 14 wherein the transmission-to-pilot ratio is not changed when the RCB is a second value.

16. The method of claim 15 wherein the transmission-to-pilot ratio is decreased by the defined value when the RCB is a third value.

17. A mobile station (MS) comprising:
transceiver circuitry for transmitting and receiving wireless communication signals in a data packet network;
transmission logic to prompt the MS to adjust reverse link transmissions;
and processor, including a memory, for processing data packets received from the transceiver circuitry wherein at least one data packet includes a transmission grant signal received from a base station (BS) wherein the transmission grant signal includes a transmission rate;
wherein the transceiver circuitry transmits sub-packets of a first data packet at the received transmission rate until an acknowledge (ACK) is received from the BS; and
wherein the transmission logic examines a rate control bit (RCB) received from the BS when a negative acknowledge (NAK) is received for the transmitted sub-packet of the first data packet;
wherein the transmission logic prompts the processor to adjust a transmission-to-pilot ratio for the sub-packets of the first data packet based upon a first value of the RCB and the transceiver circuitry transmits subsequent sub-packets of the data packets at the adjusted transmission-to-pilot ratio until the ACK is received from the BS.

18. The MS of claim 17 wherein the transmission grant signal further includes a PERSISTENCE bit and wherein the transmission logic prompts the transceiver circuitry to transmit sub-packets of a second data packet at one of an autonomous transmission rate or an incrementally adjusted transmission rate based upon a logic state of the PERSISTENCE bit.

19. The MS of claim 18 wherein the transmission logic prompts the processor to adjust the incrementally adjusted transmission rate based upon a second logic state of the PERSISTENCE bit and based upon a value of a rate control bit (RCB).

20. The MS of claim 19 wherein a first value of the RCB prompts the transmission logic to increment the incrementally adjusted transmission rate.

21. The MS of claim 20 wherein a second value of the RCB prompts the transmission logic not to adjust the incrementally adjusted transmission rate.

22. The MS of claim 21 wherein a third value of the RCB prompts the transmission to decrement the incrementally adjusted transmission rate.

23. The MS of claim 17 wherein the transmission grant signal further includes a PERSISTENCE bit and an ALL_ACID_IND bit and wherein the transmission logic prompts the transceiver circuitry to transmit sub-packets of a second data packet at one of a defined autonomous transmission rate or an incrementally adjusted transmission rate based upon a logic state of the PERSISTENCE bit and a logic state of the ALL_ACID_IND bit.

24. The MS of claim 23 wherein the sub-packets of the second data packet are transmitted at the autonomous transmission rate when the PERSISTENCE bit is set to a first logic state.

25. The MS of claim 24 wherein the sub-packets of the second data packet are transmitted at the incrementally adjusted transmission rate when the PERSISTENCE bit is set to a second logic state and wherein the incrementally adjusted transmission rate is the specified transmission data rate adjusted by the transmission logic.

26. The MS of claim 25 wherein the RCB received from the BS has an RCB value that prompts the transmission logic to one of increment the incrementally adjusted transmission rate, to decrement the incrementally adjusted transmission rate, or to not adjust the incrementally adjusted transmission rate.

27. The MS of claim 26 wherein the transmission logic prompts the processor to only adjust the incrementally adjusted transmission rate for the current H-ARQ channel based on a first logic state of the ALL_ACID_IND bit and to adjust the incrementally adjusted transmission rate for all H-ARQ channels based on a second logic state of the ALL_ACID_IND bit.

* * * * *